Dec. 8, 1942.     C. W. LEGUILLON     2,304,577
MANUFACTURE OF STRIP RUBBER
Filed April 30, 1937
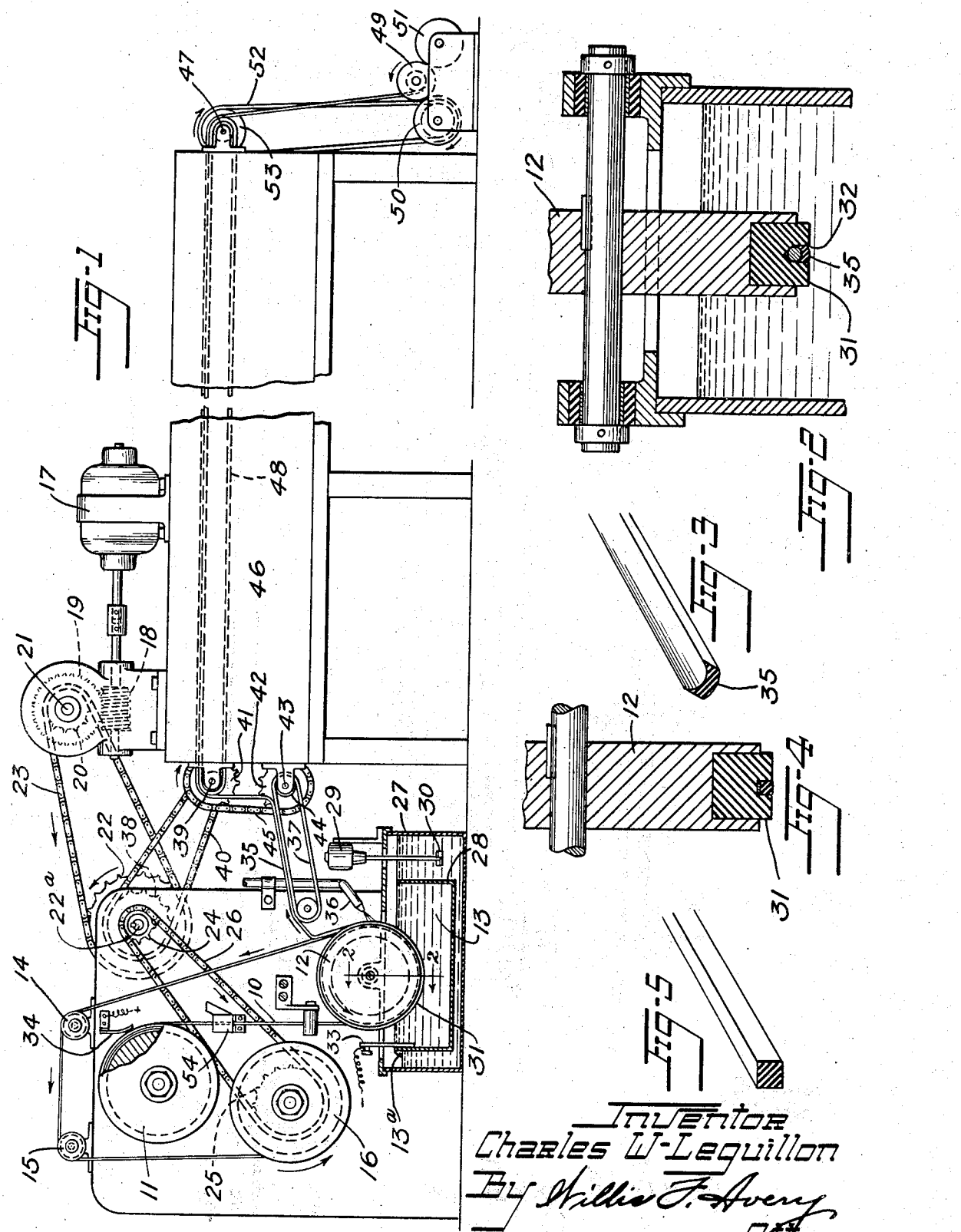
Inventor
Charles W. Leguillon
By Willis F. Avery
Atty.

Patented Dec. 8, 1942

2,304,577

UNITED STATES PATENT OFFICE 2,304,577

MANUFACTURE OF STRIP RUBBER

Charles W. Leguillon, Akron, Ohio, assignor to The B. F. Goodrich Company, New York, N. Y., a corporation of New York Application April 30, 1937, Serial No. 139,883

5 Claims. (Cl. 204—183)

This invention relates to the manufacture of strip rubber such, for example, as the elastic thread used in elastic garments.

The principal objects of the invention are to provide improved rubber thread, to provide procedure and apparatus for making strip material conveniently, economically and of uniform high quality, to control the shape and dimensions of the strip and to provide for the continuous production of a strip of great length.

These and other objects will appear from the following description and the accompanying drawing.

Of the drawing:

Fig. 1 is a side elevation of the apparatus of the invention with parts broken away and parts shown in section.

Fig. 2 is a sectional detail view taken on line 2—2 of Fig. 1 and showing the masking wheel in one of its forms as immersed in the dispersion, parts being broken away.

Fig. 3 is a perspective view of a finished rubber strip resulting from the use of an anode of circular cross-section with the masking wheel of Fig. 2.

Fig. 4 is an axial cross-sectional view of another form of masking wheel and anode as used in the production of square thread.

Fig. 5 is a perspective view of the thread produced by the use of a flat wire anode and the masking wheel of Fig. 4.

Referring to the drawing, the invention contemplates the progressive deposit of rubber from a natural or artificial dispersion thereof upon a travelling flexible anode preferably in the form of a wire of any desired cross section while masking the anode or form about a portion of its surface to prevent deposit thereon except upon the desired part of the anode surface. The anode 10 may be coiled about a drum 11 and is delivered therefrom to the face of a masking wheel 12 which is mounted to rotate freely about its axis with a portion of its perimeter immersed in a bath 13 of latex or other natural or artificial aqueous dispersion of rubber. After leaving the masking wheel the anode or flexible form is conducted about guide pulleys 14 and 15 and is rewound about a drum 16.

For advancing the form or anode through the dispersion from drum 11 to drum 16, an electric motor 17 is provided which drives the drum 16 by means such as a worm 18, a worm wheel 19 driven thereby, and a sprocket 20 mounted on a shaft 21 to which worm wheel 19 is fixed, which drives a sprocket wheel 22 mounted on a shaft 22a, by means of a chain 23.

Shaft 22a also carries a sprocket 24, fixed thereto, which drives a sprocket 25 fixed to drum 16 by a chain 26.

The bath which holds the dispersion comprises a tank 27 within which is suspended a smaller tank 28. An electric motor 29 carries an impeller blade 30 which is immersed in the dispersion between the two tanks and functions to circulate the dispersion, causing it to rise locally in the outer tank and flow into the inner tank which in turn overflows as at 13a into the outer tank. The arrangement is such that the inner tank is kept at constant level.

In order to mask the anode or form as it passes through the dispersion, the masking wheel 12 is provided with a rim 31 of insulating material such as soft vulcanized rubber or other material having substantially the physical properties thereof, semi-hard rubber, hard rubber, Bakelite, or other insulating material formed with a groove 32 having a width equal to or slightly less than the width of the anode wire. When an anode of circular cross section is used, as shown in Fig. 2, the bottom of the groove may be V-shaped whereas when an anode of ribbon form is used as illustrated in Fig. 4, the groove may be flat bottomed. Where the rim 31 is made of resilient material, such as soft rubber, semi-hard rubber, or rubber-like material, such as polymerized vinyl chloride, the resilience of the material may be utilized to effect a sealing pressure between the sides of the groove and the flexible form and the slot 32 may be made slightly less in width than the form for this purpose, although deposit entirely around the form will ordinarily be prevented by the close contact between the bottom of the groove and the form caused by the driving tension on the form. Where harder materials such as hard rubber or Bakelite are used for forming the rim 31, the slot should be accurately formed to the same width as the flexible form unless it is desired to have the form ride on the outer margins of the rim defining the groove and to depend upon tensioning of the form to seal off a portion of its surface.

Where a flexible wire is used as the form, a cathode 33 may be immersed in the tank 28 and is connected to a negative electrical source and a brush 34 or other contactor, connected to a positive source, is mounted to bear against the wire 10 as it leaves the drum 11, whereby to charge the wire positively and cause rubber from the dispersion to deposit thereon.

As the rim 31 of the masking wheel is of insulating material, the deposit 35 formed on the wire and the confining wall of the groove 32 is limited in extent to the exposed area of the wire and is somewhat molded by the side of the groove.

As the wire 10 leaves the wheel 12 it carries superimposed on its surface a strip 35 of deposited rubber. Any excess of uncoagulated dispersion or excess moisture may be removed therefrom by a jet 36 of air directed downwardly thereagainst.

The leading end of the deposited strip 35 is led over a belt 37 and is progressively stripped from the wire by the pull of the belt. Belt 37 may be driven at the same velocity as the anode wire, or at a slightly greater velocity if desired, and for this purpose suitable driving means may be provided such as a sprocket 38 fixed to shaft 22a adapted to drive a sprocket fixed to a shaft 39, through a chain 40, a sprocket 41 fixed to shaft 40, a sprocket 42 fixed to shaft 43, about which the belt 37 is driven by a pulley 44, and a chain 45.

Shaft 39 is rotatably mounted on one end of an oven 46, and a shaft 47 is similarly mounted at the opposite end of the oven. A conveyor belt 48 is driven by shaft 39 and functions to carry the rubber strip through the oven where the strip may be dried or vulcanized as desired.

As the dried or vulcanized strip leaves the oven it may be wound on a spool 49. The spool 49 may be driven by contact with a pair of cradle rolls 50, 51 on which it rests, one of these rolls being driven by a belt 52 from a pulley 53 fixed to shaft 47.

In practicing the invention the electrically charged wire 10 is drawn from the drum 11 under slight braking tension and is passed through a natural or artificial dispersion of rubber at such a velocity as to cause deposit of rubber thereon to the desired thickness. The wire is masked by the wheel 12 so that only the desired portion of its surface is exposed to receive the deposit. Deposit on the wheel 12 is prevented by the insulating material of which its rim is comprised. The deposited strip is removed from the wire and dried or vulcanized as desired. By using wires of different shapes and dimensions and masking wheels adapted thereto, the size and cross sectional shape of the rubber strip may be controlled nicely. When a square or flat wire is used in the rectangular groove, the resulting strip will be rectangular as illustrated in Fig. 5. Where a round wire is used the resulting strip will be concave on one face and convex on the opposite face and when made in the parallel-sided groove it will have its remaining sides parallel.

By use of this method a rubber thread of extreme length may be accurately produced. While ordinarily the length of the rubber thread is limited by the length of the anode wire, by using an endless wire belt, a thread of any desired length may be produced.

While I prefer to employ the electro-deposition process for selectively securing a deposit upon the flexible wire or other traveling form, other known methods of securing a selective deposit may be used in forming the strip of rubber. For instance by eliminating the cathode 33 and passing a current along the wire of sufficient strength to heat the wire, or by otherwise heating the wire as it enters the bath, and employing a dispersion sensitive to heat, selective deposit of rubber upon the wire may be attained. Furthermore by coating the wire or other flexible form with a coagulant chemical as by a swab 54 before the wire is passed into the dispersion, such coagulant will cause selective deposit upon the wire and the electric current may be dispensed with.

I claim:

1. The method of making a strip of rubber-like material which comprises progressively passing a conductive wire through a liquid dispersion of rubber-like material, progressively shielding a longitudinal zone of the wire from contact with the liquid by confining the wire between the groove-walls of a circumferentially grooved wheel, and electro-depositing a coating upon the exposed surface of the wire.

2. Apparatus for making a strip of rubber-like material, said apparatus comprising a bath of liquid-dispersed rubber, a wheel having a grooved rim of insulating material partially immersed therein, means for progressively passing a conductive strip former about the wheel within a groove thereof through said bath, means for electrically charging the strip former to effect for electro-deposit of a coating of rubber upon the exposed surface of said former, and means for progressively removing the coating from the former.

3. Apparatus for making a strip of rubber-like material, said apparatus comprising a bath of dispersed rubber-like material, a grooved wheel partially immersed therein, means for progressively passing an extensive flexible former about the wheel in the groove thereof through said bath, means for selectively depositing a coating of rubber-like material upon the exposed surface of said former, and means on said wheel for resiliently contacting the sides of the former and protecting portions of the former from deposits of coating thereon.

4. Apparatus for making a strip of rubber-like material, said apparatus comprising a bath of dispersed rubber, a wheel partially immersed therein and having its rim formed of resilient insulating material, said rim having a circumferential groove, means for progressively passing a conductive wire about said wheel while confined in said groove, means for electrically charging said wire to selectively form a strip of rubber thereon, and means for progressively removing the strip from the wire.

5. Apparatus for making a strip of rubber-like material, said apparatus comprising means for progressively passing an extensive flexible wire to a bath of dispersed rubber-like material to provide a coating of said material thereon, a wheel having a peripheral groove adapted to engage the wire as it approaches the bath with the sides of the groove in sealed engagement with the wire to prevent contact of the material with a longitudinal zone of the wire while guiding the wire through the bath of material to prevent deposit therealong, means for releasing the strip from said wire as the wire leaves the bath of material, and means for effecting deposit of the material upon the surface of the wire exposed to the bath.

CHARLES W. LEGUILLON.